United States Patent
Nielsen

[15] 3,684,078
[45] Aug. 15, 1972

[54] ROTATABLE LOAD-BEARING PENDANTS

[72] Inventor: Frank H. Nielsen, 1433 Vernon, Park Ridge Manor, Ill. 60068

[22] Filed: March 31, 1971

[21] Appl. No.: 126,110

[52] U.S. Cl............198/33 AB, 118/322, 198/177 R, 198/229
[51] Int. Cl. .......................B05c 11/14, B65g 17/20
[58] Field of Search............15/104.04, 210 B, 236 R; 118/322; 198/33 AB, 177 R, 229; 308/237, 238

[56] References Cited

UNITED STATES PATENTS

| 994,524 | 6/1911 | Kohlhepp............198/177 R X |
| 2,425,652 | 8/1947 | Starkey..................118/322 X |
| 2,696,627 | 12/1954 | Lewis...................15/236 R X |

Primary Examiner—Evon C. Blunk
Assistant Examiner—W. Scott Carson
Attorney—R. A. Blackstone

[57] ABSTRACT

A rotatable load-bearing pendant of the type commonly used in conjunction with an overhead conveyor system is provided comprising a cylindrical shaft having one end threaded and the other curved to provide a fastening means in the form of a hook. A disc having a hole therein constituting a shaftway is adapted to rotatably receive the shaft such that the threaded portion of the shaft and the shaftway provide a lateral bearing. A locknut is employed to captivate the disc on the shaft such that the bottom side of the disc and the top side of the locknut form a vertical bearing. Additional holes are provided in the disc such that they partially overlap the shaftway to thereby form small vertical slots in the side of the shaftway which cooperate with the threaded portion of the shaft to provide a self-cleaning action as the disc is rotated relative to the shaft. A U-shaped hook is symmetrically connected to the underside of the disc in order to provide means for attaching a load to the disc.

2 Claims, 5 Drawing Figures

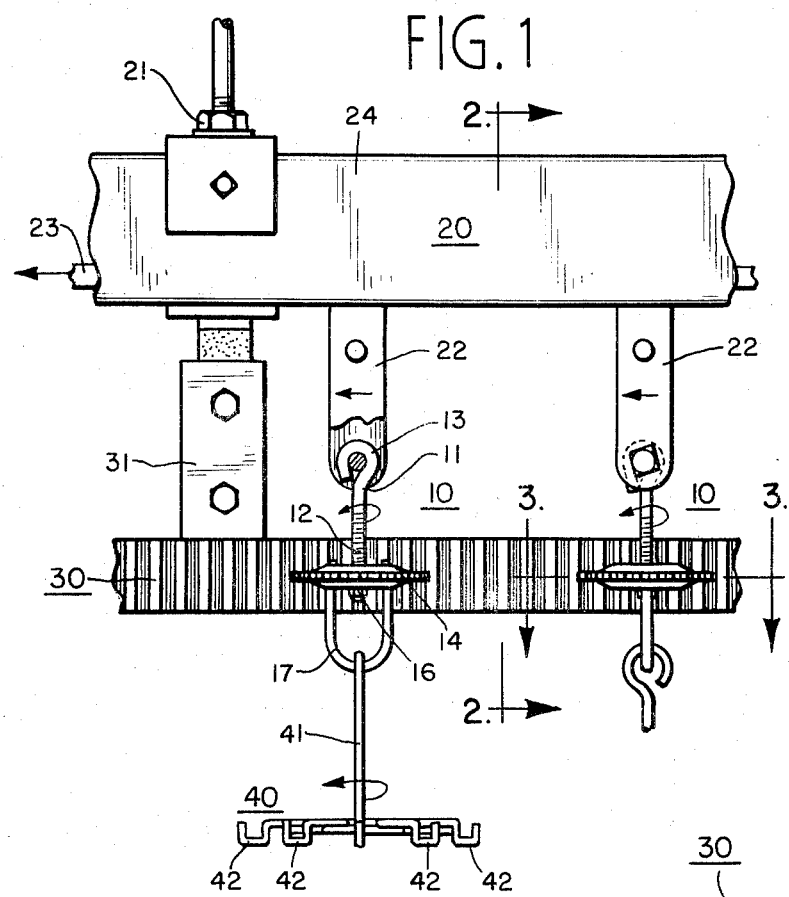
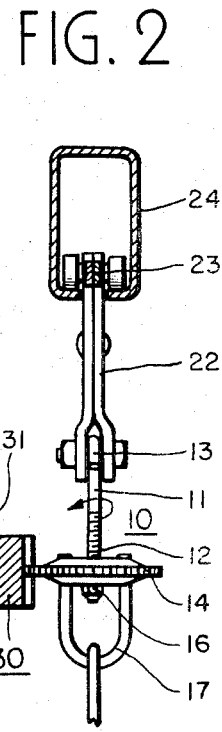
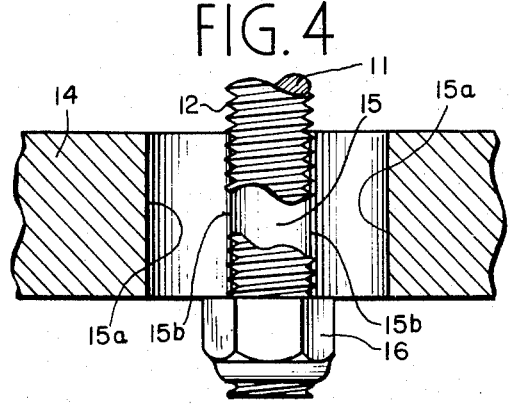
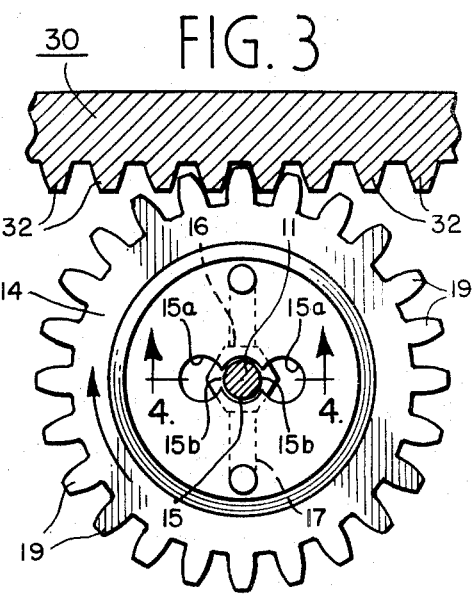
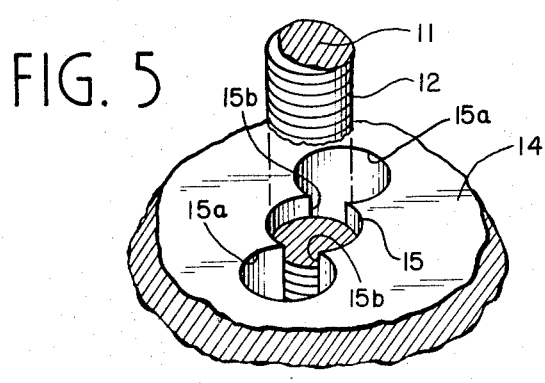
Inventor
Frank H. Nielsen

ROTATABLE LOAD-BEARING PENDANTS

BACKGROUND OF THE INVENTION

There are many applications where it is desirable to support a load in a manner such that while certain operations are performed on the load it may be rotated either manually or mechanically. In such applications, a device known in the art as a rotatable pendant is required somewhere between the support means (e.g., an overhead conveyor system) and the load itself.

Conventional rotatable pendants employ a bearing of the sliding type, such as a bushing, or of the rolling type, such as a ball bearing. Both require lubrication in order to overcome the rotational friction and reduce wear. Although these conventional pendants perform satisfactorily in some applications, there are other applications, such as food processing and electrostatic painting, where their performance is quite unsatisfactory because some of the chemicals and/or processes employed contaminate the bearing so as to necessitate frequent maintenance in the form of cleaning re-lubricating, or even complete replacement; problems that obviously add to the total manufacturing cost. In an electrostatic painting application, for example, the load (typically consisting of small metal parts) is generally cycled at least once through several operations including cleaning, drying, painting, and baking at relatively high temperatures (e.g., up to 1,800° F. or higher). Various chemicals including acids are used in the cleaning operation, the overspray of which often lands on the bearing surface as does the overspray from the painting operation. The acid/paint combination alone causes corrosion and rapidly reduces the effectiveness of the bearing's lubrication to thus compel frequent cleaning and re-lubricating of the bearing in order to maintain satisfactory operation. The baking operation, however, further complicates the lubrication/maintenance problem by causing the bearing to become completely inoperative or "frozen" in a relatively short period of time. This requires replacement of the pendants after relatively short time intervals which also adds to manufacturing costs in terms of direct part-replacement expense and the indirect expense of decreased manufacturing efficiency because of the increased "down-time".

It is therefore an important object of the present invention to provide a new and improved rotatable load-bearing pendant which is relatively inexpensive to make and maintain.

It is a more specific object of the invention to provide such a new and improved pendant which is self-cleaning and does not require lubrication.

SUMMARY OF THE INVENTION

In accordance with the invention, a rotatable load-bearing pendant which is self-cleaning and does not require lubrication comprises a shaft having threads at one end and fastening means at the other end. A disc having a hole therein constituting a shaftway adapted to rotatably receive the threaded portion of the shaft and form therewith a lateral bearing is provided with the disc having at least one additional hole therein partially overlapping the shaftway to thereby form a vertical slot in at least one portion of the shaftway. Also provided are means at the threaded end of the shaft for captivating the disc on the shaft and forming therewith a vertical bearing. Further provided are means for attaching a load to the disc.

BRIEF DESCRIPTION OF THE DRAWING

The features of the present invention which are believed to be novel are set forth with particularity in the appended claims. The invention, together with further objects and advantages thereof, may best by understood by reference to the following description taken in connection with the accompanying drawing, in the several figures of which like reference numerals identify like elements, and in which:

FIG. 1 is a front elevational view, partially cut away, of a rotatable load-bearing pendant constructed in accordance with the invention and depicted in a typical application thereof;

FIG. 2 is a sectional view taken along line 2—2 of FIG. 1;

FIG. 3 is a sectional view taken along line 3—3 of FIG. 1;

FIG. 4 is a sectional view taken along line 4—4 of FIG. 3; and

FIG. 5 is a fragmentary perspective view of the shaft and shaftway of the pendant shown in FIG. 1.

DESCRIPTION OF THE PREFERRED EMBODIMENT

With reference to FIG. 1, there is shown a rotatable load-bearing pendant 10 which is constructed in accordance with the principles of the invention. While the invention is described in an environment where a moving conveyor chain supports the pendant in a vertical manner, it is to be understood that the principles of the invention may be utilized in horizontal or other orientations where the self-cleaning and non-lubricating features are desired. As shown in FIG. 1, an overhead conveyor system 20 is provided having a stationary support member 21 and a moving support member 22. It is understood that system 20 is representative of a type of movable support means that may be utilized in the practice of this invention. A driving member 23, such as a motor-driven power chain, supported within a housing 24 supplies the moving force for member 22. A gear rack 30 is supported at a suitable distance below system 20 by a stationary vertical member 31, as hereinafter described in greater detail. Below rotatable pendant 10, a typical work-holding device 40 (referred to in the electrostatic painting art as a "spider") is attached to pendant 10 by support member 41. In an electrostatic painting application, the parts to be painted (not shown) are hung on the hooks 42 of spider 40. Additional rotatable pendants constructed in accordance with the invention may of course be placed in a series on the conveyor system, as desired. Thus, as conveyor power chain 23 moves to the left in FIG. 1, pendant 10 causes spider 40 to rotate in the direction of the arrow so that any parts carried thereby rotate past paint-spray nozzles, drying devices, and the like (all not shown) in a uniform manner as explained below in greater detail. Obviously, related applications of the invention could have the pendant remain in one place and gear rack 30 or its equivalence (e.g., a driving gear, belt, or the like) move in order to effectuate rotation of spider 40. In some applications a single relatively large load may be supported by member 41 in place of spider 40. Moreover, in non-painting applications, such as food processing, the load could be the carcass of a turkey, chicken, duck, etc. as it goes through various cleaning and even cooking operations. In short, it will become readily apparent to those skilled in the art that the invention finds particular desirability in any application requiring rotary support of a load in a bearing-contaminating environment.

As shown in FIGS. 1 and 2, a rotatable pendant 10 constructed in accordance with the invention comprises a shaft 11 having threads 12 at one end and fastening means in the form of a hook 13 at the other end. For added safety, hook 13 is preferably made so as to form a substantially closed loop to thereby greatly decrease the possibility of pendant 10 being knocked off of support member 22. The thread size is not critical; a size of 16 threads per inch has been found quire adequate. The entire shaft 11 is preferably made of a material such as stainless steel to provide adequate tensile strength and inhibit corrosion. In accordance with the invention, disc 14 is provided with a centrally located hole 15 therein (see FIG. 3) constituting a shaftway adapted to rotatably receive threads 12 of shaft 11 and form therewith a lateral bearing. Means in the form of a locknut 16 are provided at threaded portion 12 for captivating disc 14 on shaft 11 and forming therewith a vertical bearing. Disc 14 is further provided with means in the form of a U-shaped hook 17 for attaching a load such as device 40 to this disc.

As shown in greater detail, a disc 14 is further provided, in accordance with the invention, with two additional holes 15a that partially overlap shaftway 15 to thereby form two small vertical slots 15b in the side of shaftway 15. Slots 15b cooperate with threads 12 of shaft 11 to provide a self-cleaning, lubricationless action as the disc is rotated relative to the shaft. Self-cleaning is accomplished by the scraping of the inside wall of shaftway 15 by threads 12 during pendant rotation. A small amount of clearance is provided between the threads and the shaftway so that only foreign matter, not the disc itself, is scraped away. The material (paint, acid, etc.) thus removed from shaftway 15 passes through slots 15b and falls away through holes 15a. In such manner, the invention constantly removes any material that may find its way between threads 12 and shaftway 15 and thereby maintains a clean bearing surface. In the illustrated embodiment two additional holes 15a are provided but of course a single such hole or several, may be employed depending on the requirements of the particular application.

Also shown in FIg. 3 are gear teeth 19 about the periphery of disc 14 which are adapted to engage corresponding teeth 32 of gear rack 30 to rotate disc 14, and its associated load, as pendant 10 is moved by conveyor system 20. This gear and rack construction not only effectuates the desired rotation but also insures a positive, uniform rate of rotation which is highly desirable in a painting application of the invention. In addition, this positive rotation is independent of the weight of the load so that relatively small, light parts are handled just as well as large, heavy ones. The rate of rotation is of course determined by the gear size employed as well as the speed of the conveyor system and may therefore be selected to suit the particular application involved. Of course gear rack 30 may be replaced by any suitable driving means such as a driving gear, belt, or the like.

FIGS. 4 and 5 illustrate in greater detail the cooperation of threads 12, shaftway 15, holes 15a, and slots 15b. It can readily be seen that, as disc 14 rotates relative to threads 12, any foreign material on the inside of shaft hole 15 is scraped up and out through slots 15b and allowed to fall away through holes 15a. Moreover, the threads present a minimum area of contact to the side of shaftway 15 to thereby minimize the amount of friction therebetween. In such manner a rotatable load-bearing pendant constructed in accordance with the invention requires no lubrication, thereby eliminating not only the need of periodic lubrication but also the possibility of a lubricant dripping onto (and contaminating) the load.

Thus there has been shown a new and improved rotatable load-bearing pendant which requires virtually no maintenance and, from a manufacturing standpoint, is quire competitive with conventional rotatable pendants. It requires no lubrication and automatically cleans itself of dirt, paint, acid, etc. as it is being used to thus reduce required maintenance and replacement to an absolute minimum. Furthermore, such a pendant may even be used in a submerged application without any degradation in performance.

While a particular embodiment of the invention has been shown and described, it will be obvious to those skilled in the art that changes and modifications may be made without departing from the invention in its broader aspects, and, therefore, the aim in the appended claims is to cover all such changes and modifications as fall within the true spirit and scope of the invention.

I claim:

1. A rotatable load-bearing pendant which is self-cleaning and does not require lubrication, comprising:
   p1 a shaft having threads at one end and fastening means at the other end;
   a disc having a hole therein constituting a shaftway adapted to rotatably receive the threaded portion of said shaft and form therewith a lateral bearing, said disc having at least one additional hole therein partially overlapping said shaftway to thereby form a vertical slot in at least one portion of the shaftway;
   means at said threaded end of said shaft for captivating said disc on said shaft and forming therewith a vertical bearing;
   and means for attaching a load to said disc.

2. A rotatable pendant according to claim 1, in which said disc is provided with gear teeth about its periphery adapted to cooperate with a gear rack to thereby positively rotate said disc as it is moved along the rack.

* * * * *